3,640,902
CATALYST FOR THE VAPOR-PHASE OXIDATION OF LOWER OLEFINS AND A PROCESS FOR PREPARING THE SAME
Hiroo Ito, Seiichi Nakamura, and Hidemu Inoue, Minato-ku, Japan, assignors to Toa Gosei Chemical Industry Co., Ltd., Tokyo, Japan
No Drawing. Filed Sept. 10, 1968, Ser. No. 758,710
Claims priority, application Japan, Dec. 19, 1967, 42/80,940
Int. Cl. C07c 45/02
U.S. Cl. 252—439    26 Claims

ABSTRACT OF THE DISCLOSURE

A catalyst for the vapor-phase oxidation of lower olefins is described and a process for preparing it by calcining the depositions from an aqueous solution of a water-soluble compound of tri-valent chromium, a water-soluble compound of molybdenum, and a water-soluble compound of hexa-valent tellurium. Furthermore, the activity of the catalyst can be increased by the addition of cadmium, calcium, aluminum, cobalt, iron, or nickel. Special use is found in the oxidation of propylene to acrolein.

BACKGROUND OF THE INVENTION

Field of the invention

The present invention relates to a catalyst for use in the vapor-phase oxidation of lower olefins and to a process for preparing such a catalyst. The invention further relates to a process for the vapor-phase oxidation of lower olefins using the above catalyst. In particular, the present invention relates to a catalyst containing chromium, molybdenum, tellurium, and oxygen as the main components, preferably together with cadmium, calcium, aluminum, cobalt, iron or nickel, to a process for preparing the catalyst and to the use of said catalyst.

Description of the prior art

Hitherto, various attempts have been made to produce an unsaturated aldehyde by partially oxidizing a corresponding lower olefin with oxygen, or an oxygen-containing gas, in the presence of catalyst. In particular, many examples deal with obtaining acrolein from propylene and methacrolein from isobutylene.

The prior arte has been concerned with catalysts used for vapor-phase oxidation, and almost all of the attempts to thus produce unsaturated aldehydes aim at the improvement of the activity of the catalyst, that is improvements in the conversion ratio of the raw material olefin, selectivity to the unsaturated aldehyde, and in the life of the catalyst.

However, there has not yet been found a catalyst that enables acrolein or methacrolein to be obtained from propylene or isobutylene, respectively, at a low reaction temperature, with a high activity which can be maintained constant for long periods of time.

SUMMARY OF THE INVENTION

It has been found that a novel catalyst comprising chromium, molybdenum, tellurium and oxygen as its main components yields greatly improved results when utilized in the vapor-phase oxidation of lower olefins.

The activity of the above catalyst can be even further increased by the presence of "additional elements," such as cadmium, calcium, aluminum, cobalt, iron or nickel.

The gram atom percentage of chromium must be from 5 to 40%. Preferred ranges, both with and without "additional" elements are given in the text.

The catalyst of the present invention may be prepared by mixing an aqueous solution of a compound of tri-valent chromium, an aqueous solution of a compound of hexavalent tellurium, an aqueous solution of a molybdenum compound and, if necessary, an aqueous solution of a compound of the additional elements, drying the deposits from said aqueous mixture, and calcining said dried materials thus prepared. Alternatively, production may be by mixing an aqueous solution of a compound of trivalent chromium and an aqueous solution of a compound of molybdenum, and, if necessary, an aqueous solution of the additional elements, drying the deposits from said aqueous mixture and, if necessary, calcining, followed by immersing said dried materials thus prepared in an aqueous solution of a compound of hexavalent tellurium, and then drying and calcining the resultant mixture.

The invention also comprises a novel vapor-phase oxidation process wherein the catalyst of the present invention is utilized.

The catalyst of this invention may be used in a fixed bed system or in a fluidized bed system. The reaction gas consists of lower olefins, in particular, propylene, isobutylene and oxygen, and the molar ratio of olefin to oxygen may be selected in a very wide range, for example, from 1/0.5–1/10, the most preferred ratio being from 1/1 to 1/3.

The reaction is carried out in the presence of a gas which is inactive under the reaction conditions, such as nitrogen, propane, isobutane, carbon dioxide, and steam, but it is preferred to employ steam, nitrogen or a mixture thereof.

The oxidation of olefins, in particular, the oxidation of propylene and isobutylene into acrolein and methacrolein, is carried out for a contact time of 1–20 seconds at a temperature of 250–500° C., preferably 300–450° C. The oxidation is usually conducted under normal pressure, but may be conducted at reduced pressures or at elevated pressures.

Therefore, an object of the present invention is to provide an improved catalyst used for oxidizing a lower olefin to a corresponding unsaturated aldehyde using oxygen or an oxygen-containing gas, and also a process for preparing the improved catalyst.

Another object of this invention is to provide a catalyst which has a high conversion ratio and a high yield of acrolein or methacrolein from propylene or isobutylene, respectively, at a relatively lower reaction temperature using oxygen or an oxygen-containing gas and of which the activity can be maintained for a long period of time, and also a process for preparing the catalyst.

Still another object of this invention is to provide a process for producing an unsaturated aldehyde by the vapor-phase oxidation of a corresponding lower olefin, in particular propylene or isobutylene, by using the above catalyst.

These and other objects and advantages of the present invention will become apparent from the description which follows.

DESCRIPTION OF THE PREFERRED EMBODIMENTS

The technical terms used in the specification and claims of this invention have the following meanings: the gram atom percentages of chromium, molybdenum, and tellurium represent the percentage of the metal atoms of each to the sum of the number of said metal atoms in the catalyst. The conversion ratio, selectivity, yield, and contact time are calculated by the following equations:

$$\text{Conversion ratio} = \frac{\text{mol no. of consumed olefin}}{\text{mol no. of supplied olefin}} \times 100$$

$$\text{Selectivity} = \frac{\text{mol no. of formed unsaturated aldehyde (or formed unsaturated monocarboxylic acid)}}{\text{mol no. of consumed olefin}} \times 100$$

$$\text{Yield} = \text{conversion ratio} \times \text{selectivity} \times \frac{1}{100}$$

and $$\text{Contact time} = \frac{\text{apparent volume of catalyst}}{\text{volume of gas supplied to catalyst layer in unit time}}$$

The catalyst of this invention is produced by a specific process, and has a specific combination of constitutional elements and an elemental ratio that has never before been utilized. Specifically, the catalyst of this invention comprises chromium, molybdenum, tellurium, and oxygen as its main constituents, and has a specific gram atom percentage of chromium, molybdenum and tellurium. The catalyst (containing chromium, molybdenum and tellurium) can be prepared by drying and calcining the deposits from an aqueous solution of a water-soluble trivalent-chromium compound, a molybdenum compound and a hexavalent-tellurium compound. The activity of the catalyst can be further increased by adding at least one of the following: cadmium, calcium, aluminum, cobalt, iron, and nickel (hereinafter, such an element is called an additional element).

The above elements, such as chromium, cadmium, calcium, aluminum, or cobalt, are not present only in the form of oxides in the catalyst, but also in the form of a compound with molybdenum oxide. Other molybdenum compounds than the one forming the aforesaid compound are present as the oxide, such as molybdenum trioxide. On the other hand, it is believed that tellurium is present as tetravalent tellurium, but it has not been confirmed whether the tellurium is present in the form of a mixture, a solid solution or a compound with the aforesaid molybdenum compound.

The catalyst of this invention contains as its main elementary components chromium, molybdenum, and tellurium and in addition, it is necessary that the gram atom percentage of chromium be from 5–40%.

It is preferable in consideration of the influence on the conversion ratio of the raw material olefin, the selectivity to the aldehyde desired, the reaction temperature, and the life of catalyst, that the gram atom percentage of chromium be 5–39%, that of molybdenum be 51–94.5% and that of tellurium be 0.5–10%.

Moreover, in the catalyst further containing the additional elements, such as cadmium, calcium, aluminum, cobalt, iron or nickel, it is preferable, also for the same reasons, that the gram atom percentages of chromium, molybdenum, and tellurium be 2.5–35%, 55–97%, and 0.5–10%, respectively, and also that the content of the additional element (per atom of molybdenum) is 0.01–0.5 atom.

The gram atom percentage of each element in the catalyst of this invention may be varied desirably in the aforesaid range. But, when the content of the elemental chromium in the catalyst is increased further, the selectivity for the desired aldehyde will be lowered, although the conversion ratio of the raw material olefin will be increased (this means that there is some room for reducing the reaction temperature); the life of the catalyst may also be further improved. On the other hand, an increase in the content of elemental tellurium may improve the selectivity to the desired aldehyde, but this is accompanied by a reduction in the conversion ratio of the raw material olefin.

Thus, since the action of the chromium on the conversion ratio of olefin is against the action of the tellurium, the proportions of chromium and tellurium in the catalyst of this invention must be determined by considering the above facts, so that their effect can be utilized most effectively.

Among the additional elements, cadmium and nickel improve the selectivity from the olefin to an unsaturated monocarboxylic acid, for instance, from propylene to acrylic acid. Since these elements generally have an action similar to that of chromium, when the content of chromium in the catalyst is lower, the content of such additional elements may be higher. Also, when the content of chromium is higher, the content of these additional elements may be lower.

As to the order in which the additional elements contribute to catalyst activity, cadmium is highest, and the group nickel, cobalt and iron, calcium and aluminum follow, in that order.

In the aforesaid processes, the solid materials formed by drying or calcining the deposits from the mixture of an aqueous solution of a compound of trivalent chromium, an aqueous solution of a compound of molybdenum, and if necessary, an aqueous solution of a compound of the additional element, were assumed to be present as oxides of chromium and molybdenum or oxides of chromium, molybdenum, and the additional element, such as, chromium molybdate, cadmium molybdate, calcium molybdate, and the like.

Furthermore, when obtaining the molybdenum-type compounds as precipitates, aqueous ammonia or an organic amine, such as ethanolamine may be added, if desired, to the solution mixture to control the ratio of molybdenum to chromium in the precipitates. In this case, it is desirable that the pH of the aqueous solution be greater than 3. However, if the pH is too high (for example greater than 8), the chromium content in the precipitates will be too great to prepare the catalyst of this invention.

When a method is employed in which the precipitates of the aforesaid molybdenum-type compounds are not separated from the aqueous solution, and the whole of the solution containing the precipitates is dried, it is unnecessary to give specific attention to the pH when the precipitates are formed.

As mentioned above, the tellurium compound may be incorporated in the catalyst system of this invention by adding to a mixed aqueous solution of compounds (other than the tellurium compound), or else by impregnating the dried or calcined deposit from a mixed aqueous solution of compounds (other than the tellurium compound) with an aqueous solution of the tellurium compound.

The catalyst of the present invention may be supported by a carrier such as silica, alumina, diatomaceous earth, silicon carbide, zirconia, spongy aluminum, or spongy titanium. In order to support the active components of the catalyst with the carrier, the carrier may preliminarily be added to the aqueous solutions of the chromium compound, molybdenum compound, etc., or it may be added to a mixed aqueous solution of these compounds, whereby the catalyst components become attached to the carrier.

Since the trivalent chromium compound precipitates rapidly, and hence is difficult to attach as a uniform catalyst component to the carrier, it is preferable in preparing a uniformly carried catalyst to employ a method in which a carrier is immersed in an aqueous solution of the hexavalent chromium compound whereby the carrier is impregnated with the solution. Thereafter, a reducing agent is added to the mixture to reduce the hexavalent chromium to trivalent chromium, whereby the chromium compound is precipitated in the carrier. It is most suitable to add the reducing agent to the mixture after evaporating water from the immersion system so that the water content is considerably reduced.

The solid materials obtained as above are then dried and calcined. The calcining procedure is usually conducted in air at a temperature of from 430° C. to 550° C. The calcining temperature depends on the calcining time, that is, when the calcining temperature is comparatively low, the solids are calcined for a longer period of time, while when the temperature is high, the solids may be calcined for a shorter period of time. The calcining time is usually about 10 hours but when the calcining time is about 5 hours, the optimum calcining temperature is about 450° C. Further, a catalyst calcined at a lower temperature shows a tendency to increase the conversion ratio of a material oxidized at a lower reaction temperature. If a catalyst having excellent mechanical strength is required, it is necessary to calcine at a higher temperature. However, if the calcining temperature is increased too much, sintering proceeds excessively, the surface area of the catalyst is decreased, and thus the activity of the catalyst is lowered.

As illustrative water soluble trivalent chromium compounds used in the production of the catalyst of this invention, there are chromium nitrate, chromium chloride, chromium sulfate, and chromium acetate; as illustrative hexavalent chromium compounds which can be employed for the preparation of the catalyst of this invention (together with a reducing agent), there are ammonium chromate, potassium chromate, ammonium bichromate and the like. In the case of using the aforesaid hexavalent chromium compound, it is necessary to reduce the chromium to trivalent chromium by using a reducing agent. As illustrative reducing agents there may be employed various amines, aldehydes, keto acids and glycols, such as, ethanolamine, triethanolamine, ethylenediamine, glyoxylic acid, ketoglutaric acid, glyoxal, ethylene glycol, ammonium glutamate, and the like. Of course, other water-soluble reducing agents may also be used.

As illustrative of the water-soluble molybdenum compounds, there are molybdic acid, ammonium molybdate, sodium molybdate, potassium molybdate and the like. As illustrative water-soluble compounds of tellurium, there are telluric acid, sodium tellurate, potassium tellurate and the like. In addition to the water-soluble compounds illustrated above, oxides, hydrogen oxides, halogenated compounds, inorganic salts and organic salts of chromium, molybdenum, tellurium and additional elements may be used.

When the oxidation of a lower olefin is carried out under the general reaction conditions using the catalyst of this invention, the catalyst shows a very high conversion ratio and selectivity as compared to conventional catalysts. For instance, when the lower olefin is propylene, the conversion ratio of propylene easily reaches 90%, the selectivity to acrolein is 90%, and to acrylic acid is 5-30%.

Furthermore, a high conversion ratio and selectivity of the catalyst can be maintained effectively up to 1000 hours during reaction.

The following examples show the preferred embodiments of the present invention, but the scope of this invention shall not be limited thereby. All parts are by weight.

EXAMPLE 1

In 250 parts of water there was dissolved, by heating, 70.5 parts of ammonium paramolybdate $(NH_4)_6Mo_7O_{24} \cdot 4H_2O$ After further adding 13.0 parts of concentrated aqueous ammonia (28% by weight), a solution of 45.7 parts of chromium nitrate $Cr(NO_3)_3 \cdot 9H_2O$ in 150 parts of water was added to the resultant solution, with stirring, followed by further stirring for on hour at 50–60° C. By this procedure orange-green precipitates were formed, the pH of the liquid being 6.5. After further heating with stirring for one hour, a solution of 4.59 parts of telluric acid $(H_6TeO_6)$ in 50 parts of water was slowly added to the system. Thereatfer, the system was stirred (under heating), dried for five hours at 150° C., and calcined for five hours at 450° C. in air to provide a catalyst, which was crushed and sieved to a grain size of 10-20 mesh (Taylor standard sieve).

Into a stainless steel reactor (28 mm. inside diameter) was charged 50 ml. (38.42 g.) of the catalyst thus prepared, having the composition of $Cr_2 \cdot Mo_7 \cdot Te_{0.35}$ (gram atom percentage Cr 21.4%, Mo 74.9%, and Te 3.7%). While maintaining the reactor at a constant temperature by heating it in a fused nitrate bath, a mixed gas consisting of 4.0 mol percent propylene, 50.0 mol percent air, and 45.0 mol percent steam was passed through the catalyst layer in the reactor at a contact time of 4.0 seconds, the results of which are shown in Table 1, which follows Example 2.

EXAMPLE 2

A catalyst composed of a spongy titanium carrier (made by Osaka Titanium Co.; grain size 12–14 mesh) carrying the catalyst composition almost identical to that of Example 1 was prepared as follows:

Into 200 parts of water there were dissolved, with heating, 10.8 parts of ammonium bichromate, 53.0 parts of ammonium paramolybdate, and 3.44 parts of telluric acid. While evaporating water from the solution on a hot water bath, 100 parts of spongy titanium was added to the solution. After continuing the evaporation for a further two hours, 12 parts of triethanolamine was added to the system followed by stirring with heating to convert the hexavalent chromium compound to a trivalent chromium compound. The yellow-orange mixed solution formed became dark green when the evaporation was almost finished. The mixture was dried for five hours at 130° C., and calcined for five hours at 450° C. in air to provide an orange granular carried catalyst having a 30.6% by weight catalyst composition.

In the same reactor as in Example 1 there was charged 97 ml. (135.72 g., catalyst component 41.5 g.) of the catalyst formed, and a mixed gas of 50.0 mol percent air, 4.0 mol percent propylene, and 46.0 mol percent steam was passed through the catalyst layer at a rate of 36 liters/hour, the results of which are shown in Table 1.

A comparative example number (I), which illustrates the use of a conventional catalyst composed of chromium oxide and molybdenum trioxide was conducted as follows:

A mixture of 21.86 parts of chromium oxide and 144.0 parts of molybdenum trioxide was thoroughly kneaded with an aqueous solution of 11.50 parts of telluric acid in 100 parts of water, and after drying by evaporation, the mixture was calcined for five hours at 450° C. in air to provide a green catalyst, which was crushed and sieved into grains of a 10-20 mesh size.

The results obtained when using the same procedure as in Example 1 using 40 ml. (64.0 g.) of the catalyst thus prepared are shown in Table 1.

Comparative Example (2): use of hexavalent chromium compound as catalyst.

A catalyst composed of a silica-gel carrier (T–869 1/8" made by Chemetron Co.) carrying a catalyst identical to that of the catalyst in Example 1 was prepared as in Example 2, but in this case, no triethanolamine was used, the proportion of the molded silica carrier being 65 parts by weight. The catalyst obtained was gray-orange and contained 39.1% by weight catalyst components.

The results obtained upon conducting the oxidation procedure as in Example 2 by using 100 ml. (76.8 g., catalyst components 30.0 g.) of this catalyst are shown in Table 1.

TABLE 1

| Carrier | Temperature, (° C.) | (A) | (B) | (C) | (D) |
|---|---|---|---|---|---|
| Example: | | | | | |
| 1 | 392 | 81.1 | 84.2 | 6.4 | 73.5 |
|  | 414 | 86.0 | 77.7 | 8.3 | 74.0 |
| 2 Spongy Ti | 397 | 88.4 | 78.3 | 9.0 | 77.2 |
| Comparative example: | | | | | |
| (1) | 415 | 45.0 | 88.1 | 4.3 | 41.6 |
|  | 443 | 68.0 | 80.3 | 5.3 | 58.0 |
| (2) Silica-gel | 416 | 60.3 | 48.7 | 7.5 | 33.9 |
|  | 441 | 73.5 | 42.4 | 6.5 | 35.9 |

NOTE.—(A)=Conversion ratio of propylene; (B)=Selectivity to acrolein (mol percent); (C)=Selectivity to acrylic acid (mol percent), and (D)=Total yield of acrolein and acrylic acid (mol percent).

EXAMPLE 3

By the same procedure as in Example 1, a catalyst having the composition $Cr_2 \cdot Mo_7 \cdot Te_1$ (gram atom percentage Cr 20%, Mo 70% and Te 10%) was prepared. The proportion of telluric acid used therein was 13.10 parts by weight. The results obtained by processing as in Example 1, using 50 ml. (56.3 g.) of the catalyst thus prepared are shown in Table 2.

EXAMPLE 4

A catalyst having the composition $Cr_1 \cdot Mo_{12} \cdot Te_{0.6}$ (gram atom percentage Cr 7.3%, Mo 88.3%, and Te 4.4%) was prepared as follows.

In 300 parts of water there was dissolved, by heating, 88.05 parts of ammonuim paramolybdate, and then 3.7 parts of concentrated aqueous ammonium (28% by weight) was added to the solution. Thereafter, while stirring the system, an aqueous solution of 10.30 parts of chromium acetate in 40 parts of water was quickly added to the system, followed by stirring for one hour at 50-60° C. The pH of the solution was 6.4, and a small amount of orange precipitate was formed. After heating the system with stirring on a hot water bath for 1.5 hours, an aqueous solution of 5.74 parts of telluric acid in 50 parts of water was added thereto with stirring. After further stirring while heating, the product was dried for five hours at 150° C. and calcined for five hours at 450° C. in air. The catalyst thus prepared was crushed and sieved into grains of a 10-20 mesh size.

The results obtained, repeating the same procedure as in Example 1, using 50 ml. (35.0 g.) of the catalyst thus prepared are shown in Table 2.

EXAMPLE 5

A catalyst having the composition $Cr_4 \cdot Mo_6 \cdot Te_{0.3}$ (gram atom percentage Cr 38.8%, Mo 58.3% and Te 2.9%) was prepared as follows.

In 200 parts of water and 100 parts of concentrated aqueous ammonia (28% by weight), there was dissolved while heating, 81.0 parts of molybdic acid. Thereafter, while stirring thoroughly, an aqueous solution of 88.83 parts of chromium chloride in 200 parts of water was quickly added to the solution, followed by stirring for one hour at 50-60° C. The pH of the solution was 6.4, and a large quantity of green precipitates were formed.

After recovering by filtration, the precipitates were mixed with an aqueous solution of 5.74 parts of telluric acid in 50 parts of water, followed by stirring thoroughly under heating. The solid products thus obtained were dried for five hours at 150° C., calcined for five hours at 450° C., crushed, and sieved into a 10-20 mesh size. The results obtained, repeating the same procedure as in Example 1, using 50 ml. (42.34 g.) of the catalyst thus prepared are shown in Table 2.

Comparative Example 3: An excessive proportion of chromium atom was added to the catalyst.

A catalyst having the composition $Cr_4 \cdot Mo_5 \cdot Te_{0.5}$ (gram atom percentage Cr 42.1%, Mo 52.6%, and Te 5.3%) was prepared as follows.

In 250 parts of water, there was dissolved, under heating, 70.5 parts of ammonium paramolybdate. While stirring thoroughly, an aqueous solution of 128.0 parts of chromium nitrate $Cr(NO_3)_3 \cdot 9H_2O$ in 200 parts of water was added quickly to the solution. Then an aqueous solution of 9.18 parts of telluric acid in 100 parts of water was added to the mixture. Thereafter, the system was heated with stirring and the product was dried for five hours at 150° C., and calcined for five hours at 450° C.

The catalyst thus prepared was crushed and sieved into grains of a 10-20 mesh size. By using 40 ml. (27.50 g.) of the catalyst, thus prepared, the same procedure as in Example 1 was repeated, the results of which are shown in Table 2.

Comparative Example 4: use of a tetravalent tellurium compound.

A catalyst having an almost identical gram atom percentage of the metallic elements as the catalyst in Example 4 was prepared as follows.

In 250 parts by weight of water, there was dissolved 70.50 parts of ammonium paramolybdate under heating, and after further adding 30 parts of concentrated aqueous ammonia (28% by weight) to the solution, an aqueous solution of 13.34 parts of chromium nitrate in 40 parts of water added quickly to the resultant mixture with stirring. After adding a solution of 3.20 parts of tellurium dioxide in 20 parts of concentrated hydrochloric acid (35% by weight), the system was stirred thoroughly for one hour at 50-60° C., followed by processing as in Example 1 to provide the catalyst. By using 40 ml. (33.70 g.) of the catalyst thus prepared, the same procedure as in Example 1 was repeated, the results of which are shown in Table 2.

Comparative Example 5: Use of tetravalent tellurium compound.

A catalyst having an almost identical gram atom percentage of the metallic elements to that of the catalyst in Example 5 was prepared as follows:

In a mixture of 200 parts of water and 80 parts of concentrated aqueous ammonia (28% by weight), there was dissolved, under heating, 51.8 parts of molybdenum oxide. While stirring the mixture thoroughly, a solution of 63.96 parts of chromium chloride in 150 parts of water was quickly added to the resultant mixture, followed by thoroughly stirring for one hour at 50-60° C.

The pH of the solution was 6.4, and a large quantity of green precipitates were formed.

After filtering, the precipitates were mixed with a solution of 2.88 parts of tellurium dioxide in 20 parts of concentrated hydrochloric acid. After thoroughly stirring, the pH of the solution was adjusted to 6.4 with aqueous ammonia, followed by stirring under heating. The product was dried for five hours at 130° C., calcined for five hours at 450° C. in air, and crushed and sieved into grains of a 10-20 mesh size.

By using 40 ml. (34.10 g.) of the catalyst thus prepared, the same procedure as in Example 1 was repeated, the results of which are shown in Table 2.

Comparative Example 6: Use of a divalent tellurium compound.

A catalyst having an almost identical gram atom percentage of the metallic elements as the catalyst of Example 1 was prepared as in Example 1.

In addition, in this case, a solution prepared by dissolving 2.88 parts of tellurium oxide (TeO) in 30 parts of concentrated sulfuric acid was used. By using 40 ml. (13.68 g.) of the catalyst thus prepared, the same procedure as in Example 1 was repeated, the results of which are shown in Table 2.

TABLE 2

| Catalyst Cr/Mo/Te | Atomic valence of Te | (A) | (B) | (C) | (D) | (E) |
|---|---|---|---|---|---|---|
| Example: | | | | | | |
| 3 | 2/7/1 | 6 | 398 | 60.5 | 87.4 | 3.5 | 55.1 |
|  |  |  | 439 | 85.0 | 80.3 | 6.5 | 73.8 |
| 4 | 1/12/0.6 | 6 | 399 | 80.5 | 88.7 | 3.2 | 74.0 |
|  |  |  | 425 | 85.0 | 82.1 | 4.5 | 73.6 |
| 5 | 4/6/0.3 | 6 | 341 | 75.2 | 86.7 | 3.7 | 68.0 |
|  |  |  | 356 | 83.2 | 83.5 | 5.2 | 73.8 |
| Comparative example: | | | | | | |
| (3) | 4/5/0.5 | 6 | 380 | 62.3 | 32.1 | 5.0 | 23.1 |
| (4) | 1/12/0.6 | 4 | 460 | 75.5 | 79.9 | 4.2 | 63.5 |
| (5) | 4/6/0.3 | 4 | 399 | 73.9 | 77.5 | 8.0 | 63.2 |
| (6) | 2/7/0.35 | 2 | 394 | 88.4 | 63.1 | 13.3 | 67.5 |

NOTE.—(A)=Reaction temperature (° C.); (B)=Conversion ratio of propylene (mol percent); (C)=Selectivity to acrolein (mol percent); (D)=Selectivity to acrylic acid (mol percent); and (E)=Total yields for acrolein and acrylic acid (mol percent).

EXAMPLE 6

By using the catalyst and the apparatus of Example 1, a mixed gas of 4.5 mol percent isobutylene, 50 mol percent air, and 45.5 mol percent steam was passed through a catalyst layer at a reaction temperature of 375° C. and a contact time of 4.0 seconds, whereby the conversion ratio of isobutylene was 76.2%, the selectivity to methacrolein 66.0%, the selectivity to methacrylic acid 7.5%, and the total yields for methacrolein and methacrylic acid 56.0%.

EXAMPLE 7

A catalyst having the composition $Cr_1 \cdot Al_6 \cdot Mo_{12} \cdot Te_{0.6}$ (gram atom percentages of Cr, Mo, and Te: Cr 7.4%, Mo 88.2%, and Te 4.4%) was prepared as follows.

In 300 parts by weight of water was dissolved, under heating, 88.05 parts of ammonium paramolybdate. After adding 32.0 parts of concentrated aqueous ammonia (28% by weight) to the solution, an aqueous solution of 16.67 parts of chromium nitrate and 93.8 parts of aluminum nitrate in 200 parts of water was quickly added to the resultant mixture with thorough stirring, followed by additional stirring for one hour at 50–60° C. Thereafter, an aqueous solution of 5.74 parts of telluric acid in 50 parts of water was added to the mixture and the system was stirred under heating for five hours at 150° C. The product was dried for five hours at 150° C. and calcined for five hours at 450° C. in air. The catalyst thus obtained was crushed and sieved into grains of a 10–20 mesh size. By using 40 ml. (29.49 g.) of the catalyst thus prepared, the same procedure as in Example 1 was repeated, the results of which are shown in Table 3.

EXAMPLE 8

A catalyst having the composition $Cr_1 \cdot Ca_{0.6} \cdot Mo_6 \cdot Te_{0.3}$ (gram atom percentages of Cr, Mo, and Te: Cr 13.7%, Mo 82.2%, and Te 4.1%) was prepared as follows.

In 250 parts of water was dissolved, under heating, 70.50 parts of ammonium paramolybdate. After further adding 10.0 parts of concentrated aqueous ammonia (28% by weight) to the solution, a solution of 26.68 parts of chromium nitrate and 9.45 parts of calcium nitrate in 80 parts of water was quickly added to the resultant mixture, with stirring, followed by additional stirring for one hour at 50–60° C. Then a solution of 4.59 parts of telluric acid in 50 parts of water was added to the mixture, followed by stirring under heating. The product was dried for five hours at 150° C. and calcined for five hours at 450° C. in air. The catalyst thus obtained was crushed and sieved into grains of a 10–20 mesh size.

By using 40 ml. (34.56 g.) of the catalyst thus prepared, the same procedure as in Example 1 was repeated, the results of which are shown in Table 3.

EXAMPLE 9

A catalyst having the composition $$Cr_2 \cdot Cd_{0.7} \cdot Mo_7 \cdot Te_{0.35}$$

(gram atom percentages of Cr, Mo and Te: Cr 21.4%, Mo 74.9% and Te 3.7%) was prepared as in Example 1. In this case, a solution of 12.34 parts of cadmium nitrate in 70 parts of water was added after addition of chromium nitrate. The results obtained by repeating the same procedure as in Example 1, using 50 ml. (39.73 g.) of the catalyst thus prepared, are shown in Table 3.

EXAMPLE 10

A catalyst having the composition $Cr_2 \cdot Co_{0.7} \cdot Mo_7 \cdot Te_1$ (gram atom percentages of Cr, Mo and Te: Cr 20%, Mo 70% and Te 10%) was prepared as follows.

In 250 parts of water there was dissolved, under heating, 70.50 parts of ammonium paramolybdate. After further adding 16.0 parts of concentrated aqueous ammonia (28% by weight) to the solution, a solution of 45.70 parts of chromium nitrate and 11.64 parts of cobalt nitrate in 150 parts of water was quickly added to the resultant mixture with stirring, followed by additional stirring for one hour at 50–60° C. Then, a solution of 13.13 parts of telluric acid in 150 parts of water was added to the mixture, followed by stirring under heating. The product was dried for five hours at 150° C. and calcined for five hours at 450° C. in the air.

The catalyst thus obtained was crushed and sieved into grains of a grain size of 10–20 mesh. By using 40 ml. (28.40 g.) of the catalyst, the same procedure as in Example 1 was repeated, the results of which are shown in Table 3.

Comparative Example 7: Use of a tretravalent tellurium compound.

A catalyst having the composition $Cr_1 \cdot Ca_{0.6} \cdot Mo_6 \cdot Te_{0.3}$ (gram atom percentages of Cr, Mo, and Te: Cr 13.7%, Mo 82.2%, and Te 4.1%) was prepared as follows.

In 250 parts of water, there was dissolved, under heating, 70.50 parts of ammonium paramolybdate and after further adding 35 parts of concentrated aqueous ammonia (28% by weight) to the solution, an aqueous solution of 26.69 parts of chromium nitrate and 9.44 parts of calcium nitrate in 70 parts of water was quickly added to the mixture. Then there was further adding a solution of 3.20 parts of tellurium dioxide in 20 parts of concentrated hydrochloric acid (35% by weight). The mixture was then thoroughly stirred for one hour at 50–60° C. After stirring under heating, the product was dried for five hours at 130° C. and calcined in air for five hours at 450° C.

The catalyst thus obtained was crushed and sieved into grains of a 10–20 mesh size. By using 40 ml. (29.59 g.) of the catalyst, the same procedure as in Example 1 was repeated, the results of which are shown in Table 3.

Comparative Example 8: Use of a tetravalent tellurium compound.

A catalyst having the composition $Cr_2 \cdot Co_{0.7} \cdot Mo_7 \cdot Te_1$ (gram atom percentages of Cr, Mo, and Te: Cr 20%, Mo 70%, and Te 10%) was prepared as follows.

In 250 parts of water, there was dissolved, under heating, 70.50 parts of ammonium paramolybdate. After further adding 100 parts of concentrated aqueous ammonia (28% by weight) and 9.14 parts of tellurium dioxide to the solution, the resultant mixture was stirred under heating. Then, an aqueous solution of 45.70 parts of chromium nitrate and 11.64 parts of cobalt nitrate in 150 parts of water was quickly added to the mixture with thorough stirring followed by additional stirring for one hour at 50–60° C. The product was then dried for five hours at 130° C. and calcined for five hours at 450° C. in the air.

The catalyst was crushed and sieved into grains of a 10–20 mesh size, and by using 40 ml. (28.84 g.) of the catalyst, the same procedure as in Example 1 was repeated, the results of which are shown in Table 3.

Comparative Example 9: Use of a divalent tellurium compound.

A catalyst having the composition $$Cr_2 \cdot Cd_{0.7} \cdot Mo_7 \cdot Te_{0.35}$$

(gram atom percentages of Cr, Mo, and Te: Cr 21.4%, Mo 74.9%, and Te 3.7%) was prepared as follows.

In 250 parts of water was dissolved, under heating 70.50 parts of ammonium paramolybdate. After further adding 17.0 parts of concentrated aqueous ammonia (28% by weight) to the solution, an aqueous solution of 45.70 parts of chromium nitrate and 12.34 parts of cadmium nitrate in 150 parts of water was quickly added to the mixture followed by stirring for one hour at 50–60° C.

Thereafter, 2.88 parts of tellurium oxide powder (TeO) was added to the mixture. After stirring the system under heating, the product was dried for five hours at 130° C., and calcined for five hours at 450° C. in the air. The catalyst was crushed and sieved into grains of a 10–20 mesh size, and by using 40 ml. (28.67 g.) of the catalyst, the same procedure as in Example 1 was repeated, the results of which are shown in Table 3.

TABLE 3

| Catalyst component | Valence of Te | (A) | (B) | (C) | (D) | (E) |
|---|---|---|---|---|---|---|
| Example: | | | | | | |
| 7 — Cr/Al/Mo/Te 1/6/12/0.6 | 6 | 385 / 396 | 82.4 / 92.7 | 84.0 / 76.6 | 7.4 / 8.5 | 75.3 / 78.9 |
| 8 — Cr/Ca/Mo/Te 1/0.6/6/0.3 | 6 | 395 / 415 | 84.5 / 94.8 | 86.1 / 81.8 | 7.5 / 9.8 | 79.1 / 86.8 |
| 9 — Cr/Cd/Mo/Te 2/0.7/7/0.35 | 6 | 374 / 383 | 92.7 / 96.3 | 82.7 / 75.8 | 7.7 / 9.9 | 83.8 / 82.5 |
| 10 — Cr/Co/Mo/Te 2/0.7/7/1 | 6 | 412 / 423 | 83.0 / 89.5 | 83.9 / 78.7 | 10.2 / 11.1 | 78.1 / 80.4 |
| Comparative example: | | | | | | |
| (7) — Cr/Ca/Mo/Te 1/0.6/6/0.3 | 4 | 408 | 84.2 | 79.7 | 8.0 | 73.8 |
| (8) — Cr/Co/Mo/Te 2/0.7/7/1 | 4 | 428 | 92.0 | 70.5 | 10.9 | 74.9 |
| (9) — Cr/Cd/Mo/Te 2/0.7/7/0.35 | 2 | 370 | 94.2 | 60.4 | 14.0 | 70.1 |

NOTE.—See footnote at bottom Table 2.

EXAMPLE 11

By using the catalyst of Example 8 and the apparatus used in Example 1, a mixed gas of 2.5 mol percent isobutylene, 50.5 mol percent air, and 47.0 mol percent steam was passed through the catalyst layer at a reaction temperature of 385° C. and a contact time of 4.0 sec. The conversion ratio of isobutylene was 84.5%, the selectivity to methacrolein 74.4%, the selectivity to methacrylic acid 8.4%, and the total yields for methacrolein and methacrylic acid 70.0%.

EXAMPLE 12

By using the catalyst of Example 9 and the apparatus used in Example 1, a gas mixture of 2.8 mol percent isobutylene, 50.0 mol percent air and 47.2 mol percent steam was passed through the catalyst layer at a reaction temperature of 350° C. and a contact time of 4.0 sec. The conversion ratio of isobutylene was 91.4%, the selectivity to methacrolein 75.6%, the selectivity to methacrylic acid 7.2%, and the total yields for methacrolein and methacrylic acid 75.6%.

EXAMPLE 13

By using the catalyst of Example 10 and the apparatus used in Example 1, a mixed gas of 2.5 mol percent isobutylene, 50.0 mol percent air, and 47.5 mol percent steam was passed through the catalyst layer at a reaction temperature of 370° C. and a contact time of 4.0 sec. The conversion ratio of isobutylene was 89.5%, the selectivity to methacrolein 67.8%, the selectivity to methacrylic acid 8.5%, and the total yields for methacrolein and methacrylic acid 68.3%.

EXAMPLE 14

A catalyst having the composition $Cr_6 \cdot Cd_{0.65} \cdot Mo_{13} \cdot Te_1$ (gram atom percentages of Cr, Mo, and Te: Cr 30%, Mo 65%, and Te 5%) was prepared as follows.

In 200 parts of water and 67 parts of concentrated aqueous ammonia (28% by weight), there was dissolved, under heating, 46.80 parts of molybdenum oxide ($MoO_3$). Then a solution of 60.0 parts of chromium nitrate and 5.01 parts of cadmium nitrate in 200 parts of water was quickly added to the solution, with stirring, followed by stirring thoroughly for one hour at 50–60° C.

In addition, an aqueous solution of 5.74 parts of telluric acid in 50 parts of water was added to the mixture, and after stirring under heating, the product was dried for five hours at 150° C., and samples were calcined for five hours at 400° C., 450° C., 480° C., 500° C., and 550° C., respectively, crushed and sieved into grains of a 10–20 mesh size. By using 40 ml. of the catalyst, the procedure of Example 1 was repeated, the results of which are shown in Table 4.

The aforesaid composition mixture was also stirred, under heating, without adding telluric acid, the product was dried for five hours at 150° C. and calcined for five hours at 450° C. or 550° C., in air. The product was then crushed and sieved into grains of a 10–20 mesh size. Thereafter 33.74 parts of the product was added to an aqueous solution of 3.22 parts of telluric acid in 20 parts of water, whereby the product was impregnated with the solution. After drying the mixture, the product was calcined for five hours at 450° C.

By using 40 ml. of the catalyst, thus prepared, the procedure of Example 1 was repeated, the results of which are shown in Table 4.

TABLE 4

| Calcining temperature (Te-addition stop) | Weight of 40 ml. of catalyst | Reaction temperature (° C.) | Conversion ratio of propylene (mol percent) | Selectivity to— Acrolein (mol percent) | Selectivity to— Acrylic acid | Total yields [1] (mol percent) |
|---|---|---|---|---|---|---|
| After addition of telluric acid (no pre-calcining): | | | | | | |
| 400° C | 25.59 | 351 / 374 | 80.5 / 95.5 | 73.3 / 65.3 | 9.9 / 11.6 | 67.0 / 73.4 |
| 450° C | 22.58 | 373 / 395 | 84.0 / 96.1 | 85.8 / 79.1 | 8.6 / 10.1 | 79.3 / 85.7 |
| 480° C | 25.25 | 405 / 415 | 88.9 / 94.5 | 83.3 / 79.5 | 6.5 / 8.3 | 79.8 / 83.0 |
| 500° C | 27.29 | 411 / 436 | 87.8 / 94.9 | 82.9 / 77.7 | 5.9 / 7.3 | 78.0 / 80.3 |
| 550° C | 30.79 | 417 / 436 | 75.0 / 87.1 | 88.8 / 85.5 | 4.0 / 5.3 | 69.6 / 79.1 |
| After calcining at 450° C., Te is added; further calcined at 450° C | 33.12 | 392 / 403 | 76.9 / 86.7 | 82.5 / 79.2 | 9.0 / 9.7 | 70.4 / 77.1 |
| After calcining at 550° C., Te is added; further calcined at 450° C | 37.80 | 376 / 407 | 83.9 / 94.3 | 77.4 / 70.7 | 9.1 / 13.1 | 72.6 / 79.0 |

[1] Total yields of Acrolein and acrylic acid (mol percent).

Then, a "lifetime" test was conducted under the same conditions as in Example 1 for 40 ml. (41.13 g.) of the above catalyst (molded to a 4 mm. diameter and a 2 mm. thickness by a molding machine) prepared by calcining for five hours at 450° C. in air without conducting a pre-calcining. The results are shown in Table 5.

TABLE 5

| Time after supplying of gas mixture | (A) | (B) | (C) | (D) | (E) |
|---|---|---|---|---|---|
| Hours: | | | | | |
| 50 | 380 | 93.8 | 81.4 | 6.3 | 82.3 |
| 200 | 372 | 94.0 | 81.9 | 6.8 | 83.3 |
| 400 | 370 | 93.7 | 80.4 | 6.9 | 81.8 |
| 600 | 370 | 93.2 | 81.5 | 6.2 | 81.7 |

Note.—See footnote at bottom Table 2.

EXAMPLE 15

A catalyst oxide composition of $Cr_2 \cdot Ni_{0.7} \cdot Mo_7 \cdot Te_{0.175}$ (gram atom percentages of Cr, Mo, Te: Cr 21.8%, Mo 76.3%, and Te 1.9%) and 10% by weight silica as carrier was prepared as follows.

In 250 parts of water there was dissolved, under heating, 70.5 parts of ammonium paramolybdate. After adding 15.0 parts of concentrated aqueous ammonia (28% by weight) and 40 parts of colloidal silica gel (Snow Tex, trade name of Nissan Chemical Industry Co.; $SiO_2$ 20% by weight) to the solution, an aqueous solution of 45.70 parts of chromium nitrate and 11.63 parts of nickel nitrate in 150 parts of water was quickly added to the mixture with stirring. After stirring for two hours at 50–60° C., an aqueous solution of 2.30 parts of telluric acid in 20 parts of water was added to the mixture. The system was then stirred under heating, the product was dried for five hours at 150° C., calcined for five hours at 450° C. in air, and crushed and sieved into grains of 10–20 mesh size. The same procedure as in Example 1 was repeated using 40 ml. (28.53 g.) of the catalyst thus obtained, the conversion ratio of polypylene at a reaction temperature of 365° C. being 97.3%, the selectivity to acrolein 49.0%, the selectivity to acrylic acid 29.1%, and the total yields for acrolein and acrylic acid 76.0%.

EXAMPLE 16

By using the catalyst prepared in Example 15 and the apparatus used in Example 1, a mixed gas of 2.4 mol percent isobutylene, 50.0 mol percent air, and 47.6 mol percent steam was passed through the catalyst layer at a reaction temperature of 372° C. and a contact time of 4.0 sec. The conversion ratio of isobutylene was 92.4%, the selectivity to methacrolein 56.8%, the selectivity to methacrylic acid 15.7%, and the total yields for methacrolein and methacrylic acid 67.0%.

EXAMPLE 17

A catalyst having the composition

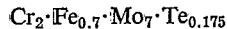

$Cr_2 \cdot Fe_{0.7} \cdot Mo_7 \cdot Te_{0.175}$ (gram atom percentages of Cr, Mo, and Te: Cr 21.8%, Mo 76.3%, and Te 1.9%), containing 10% by weight of silica gel was prepared as follows.

In 250 parts of water, there was dissolved, under heating, 70.50 parts of ammonium paramolybdate. After furthere adding 15.0 parts of concentrated aqueous ammonia (28% by weight) and 35.50 parts of a water-soluble silica gel (Snow Tex, 20% by weight), an aqueous solution of 45.70 parts of chromium nitrate and 16.16 parts of iron nitrate $(Fe(NO_3)_3 \cdot 9H_2O)$ in 200 parts of water was quickly added to the solution. Then, after stirring the mixture for two hours at 50–60° C., 10 ml. of an aqueous solution of telluric acid having a concentration of 1 mol/ liter was added to the mixture. The pH of the solution was 6.4 and gray-brown precipitates were formed. The mixture was further stirred under heating, and the product was dried for five hours at 150° C., calcined for five hours at 450° C., and crushed and sieved into grains of a 10–20 mesh size. Repeating the same procedure as in Example 1, at a reaction temperature of 357° C. using 50 ml. (33.61 g.) of the catalyst, the conversion ratio of propylene was 89.1%, the selectivity to acrolein 72.2%, the selectivity to acrylic acid 13.0%, and the total yields for acrolein and acrylic acid 75.9%.

EXAMPLE 18

Using the catalyst prepared in Example 17 and the apparatus used in Example 1, a mixed gas of 2.5 mol percent isobutylene, 50 mol percent air, and 47.5% steam was passed through the catalyst layer at a reaction temperature of 355° C. and a contact time of 4.0 sec. The conversion ratio of isobutylene was 93.5%, the selectivity to methacrolein 74.4%, the selectivity to methacrylic acid 5.9%, and the total yields for methacrolein and methacrylic acid 75.1%.

While the above has been described in connection with the preferred embodiments of this invention, it will be obvious to those skilled in the art that various changes and modifications may be made therein without departing from the invention, and it is aimed, therefore, to cover in the appended claims all such changes and modifications as falling within the true spirit and scope of this invention.

What is claimed is:

1. A catalyst for the vapor phase oxidation of lower olefins consisting essentially of from about 5 to about 40% chromium, from about 51 to about 94.5% molybdenum, from about 0.05 to about 10% tellurium, oxygen and from about 0.01 to about 0.5 atom of cadmium per atom of said molybdenum, all percents being gram atom percents, said chromium, molybdenum, tellurium and cadmium having been incorporated into said catalyst by drying, and calcining at about 430 to about 550° C. for about 5 to about 10 hours, the deposits from an aqueous solution of a trivalent chromium compound, a molybdenum compound, a hexavalent tellurium compound and a water soluble cadmium compound, wherein said trivalent chromium compound is selected from the group consisting of chromium nitrate, chromium chloride, chromium sulfate, chromium acetate, ammonium chromate and a reducing agent, potassium chromate and a reducing agent and ammonium bichromate and a reducing agent; said molybdenum compound is selected from the group consisting of molybdic acid, ammonium molybdate, sodium molybdate and potassium molybdate; and said hexavalent tellurium compound is selected from the group consisting of telluric acid, sodium tellurate and potassium tellurate.

2. A process for the preparation of a catalyst for the vapor phase oxidation of lower olefins, said catalyst consisting essentially of from about 5 to about 40% chromium, from about 51 to about 94.5% molybdenum, from about 0.5 to about 10% tellurium, oxygen and from about 0.01 to about 0.5 atom of cadmium per atom of said molybdenum, all percentages being gram atom percentages, which comprise drying, and calcining in the presence of a molecular oxygen containing gas, the deposits from an aqueous solution of a trivalent chromium compound, a molybdenum compound, a hexavalent tellurium compound and a water-soluble cadmium compound, wherein said trivalent chromium compound is selected from the group consisting of chromium nitrate, chromium chloride, chromium sulfate, chromium acetate, ammonium chromate and a reducing agent, potassium chromate and a reducing agent and ammonium bichromate and a reducing agent;

said molybdenum compound is selected from the group consisting of molybdic acid, ammonium molybdate, sodium molybdate and potassium molybdate; and said hexavalent tellurium compound is selected from the group consisting of telluric acid, sodium tellurate and potassium tellurate.

3. The process as claimed in claim 2, wherein said molybdenum compound is selected from the group consisting of molybdic acid and a salt thereof.

4. The process as claimed in claim 2, wherein said tellurium compound is selected from the group consisting of telluric acid and a salt thereof.

5. The process as claimed in claim 2, wherein said calcining is at 430–550° C. in the presence of molecular oxygen.

6. The process of claim 5 wherein said calcining is for from about 5 to about 10 hours.

7. The process as claimed in claim 2, wherein said catalyst composition is deposited from the aqueous solution in the presence of a solid carrier.

8. The process of claim 2 wherein the gram atom percentage of said chromium is from 5 to 39%.

9. A process for the preparation of a catalyst for the vapor phase oxidation of lower olefins, said catalyst consisting essentially of chromium, molybdenum, tellurium, oxygen and cadmium, the gram atom percentages of said chromium, molybdenum, and tellurium being from about 5 to about 39%, from about 51 to about 94.5%, and from about 0.5 to about 10%, respectively, and said cadmium being present in an amount from about 0.01 to about 0.5 atom of cadmium per atom of said molybdenum, which comprises impregnating a member selected from the group consisting of the deposits, the dried product and the calcined product of said deposits, with an aqueous solution of a hexavalent tellurium compound, and thereafter drying and calcinating said impregnates, said deposits being derived from an aqueous solution of a trivalent chromium compound, a molybdenum compound, and a water soluble cadmium compound, said calcining being in the presence of a molecular oxygen gas, and further wherein said trivalent chromium compound is selected from the group consisting of chromium nitrate, chromium chloride, chromium sulfate, chromium acetate, ammonium chromate and a reducing agent, potassium chromate and a reducing agent and ammonium bichromate and a reducing agent;

said molybdenum compound is selected from the group consisting of molybdic acid, ammonium molybdate, sodium molybdate and potassium molybdate; and said hexavalent tellrium compound is selected from the group consisting of telluric acid, sodium tellurate and potassium tellurate.

10. The process as claimed in claim 9, wherein said molybdenum compound is selected from the group consisting of molybdic acid and a salt thereof.

11. The process as claimed in claim 9, wherein said tellurium compound is selected from the group consisting of telluric acid and a salt thereof.

12. The process as claimed in claim 9, wherein calcining is at 430–550° C. in the presence of molecular oxygen.

13. The process of claim 12 wherein said calcining is for from about 5 to about 10 hours.

14. The process as claimed in claim 9, wherein said catalyst is deposited from the aqueous solution in the presence of a solid carrier.

15. A process for the preparation of a catalyst for the vapor phase oxidation of lower olefins, said catalyst consisting essentially of chromium, molybdenum, tellurium, oxygen and cadmium, the gram atom percentages of said chromium, molybdenum and tellurium being from about 2.5 to about 35%, from about 55 to about 97%, and from about 0.5 to about 10%, respectively, and the content of cadmium being from about 0.01 to about 0.5 atom per atom of said molybdenum, said process comprising drying and calcining the deposits from an aqueous solution of a trivalent chromium compound, a molybdenum compound, a hexavalent tellurium compound and a water-soluble cadmium compound, wherein said trivalent chromium compound is selected from the group consisting of chromium nitrate, chromium chloride, chromium sulfate, chromium acetate, ammonium chromate and a reducing agent, potassium chromate and a reducing agent and ammonium bichromate and a reducing agent;

said molybdenum compound is selected from the group consisting of molybdic acid, ammonium molybdate, sodium molybdate and potassium molybdate; and said hexavalent tellurium compound is selected from the group consisting of telluric acid, sodium tellurate and potassium tellurate.

16. The process as claimed in claim 15, wherein said molybdenum compound is selected from the group consisting of molybdic acid and a salt thereof.

17. The process as claimed in claim 15, wherein said tellurium compound is selected from the group consisting of telluric acid and a salt thereof.

18. The process as claimed in claim 15, wherein calcining is at 430–550° C. in the presence of molecular oxygen.

19. The process of claim 18 wherein said calcining is for from about 5 to about 10 hours.

20. The process as claimed in claim 15, wherein said catalyst composition is deposited from the aqueous solution in the presence of a solid carrier.

21. A process for the preparation of a catalyst for the vapor phase oxidation of lower olefins, said catalyst consisting essentially of chromium, molybdenum, tellurium, oxygen, and cadmium, the gram atom percentages of said chromium, molybdenum and tellurium being from about 2.5 to about 35%, from about 55 to about 97%, and from about 0.5 to about 10%, respectively, and the content of cadmium being from about 0.01 to about 0.5 atom per atom of said molybdenum, which comprises impregnating a member selected from the group consisting of the deposits, the dried product and the calcined product of said deposits produced from an aqueous solution of a trivalent chromium compound, a molybdenum compound and a water-soluble cadmium compound with an aqueous solution of a hexavalent tellurium compound, and drying and calcining the impregnate thus formed, said calcining being in the presence of a molecular oxygen containing gas, wherein said trivalent chromium compound is selected from the group consisting of chromium nitrate, chromium chloride, chromium sulfate, chromium acetate, ammonium chromate and a reducing agent, potassium chromate and a reducing agent and ammonium bichromate and a reducing agent;

said molybdenum compound is selected from the group consisting of molybdic acid, ammonium molybdate, sodium molybdate and potassium molybdate; and said hexavalent tellurium compound is selected from the group consisting of telluric acid, sodium tellurate and potassium tellurate.

22. The process as claimed in claim 21, wherein said molybdenum compound is selected from the group consisting of molybdic acid and a salt thereof.

23. The process as claimed in claim 21, wherein said tellurium compound is selected from the group consisting of telluric acid and a salt thereof.

24. The process as claimed in claim 21, wherein calcining is at 430–550° C. in the presence of molecular oxygen.

25. The process of claim 24 wherein said calcining is for from about 5 to about 10 hours.

26. The process as claimed in claim 21, wherein said catalyst composition is deposited from the aqueous solution in the presence of a solid carrier.

(References on following page)

References Cited

UNITED STATES PATENTS

| | | | |
|---|---|---|---|
| 3,194,771 | 7/1965 | Vasseur et al. | 260—604 X |
| 3,236,782 | 2/1966 | Koch | 260—604 X |
| 3,347,899 | 10/1967 | Caporali et al. | 252—439 X |
| 3,417,144 | 12/1968 | Cahoy et al. | 260—604 |
| 3,437,690 | 4/1969 | Young et al. | 260—604 X |

FOREIGN PATENTS

| | | | |
|---|---|---|---|
| 1,001,505 | 8/1965 | Great Britain | 260—604 |
| 1,086,523 | 10/1967 | Great Britain | 260—533 U |

PATRICK P. GARVIN, Primary Examiner

U.S.Cl. X.R.

260—604 R